United States Patent [19]

Carroll

[11] 4,133,343

[45] Jan. 9, 1979

[54] VALVE ASSEMBLY FOR A BRAKE SYSTEM

[75] Inventor: Luther E. Carroll, Dayton, Ohio

[73] Assignee: General Motors Corporation, Detroit, Mich.

[21] Appl. No.: 732,765

[22] Filed: Oct. 15, 1976

[51] Int. Cl.² ............................................ F16K 45/02
[52] U.S. Cl. .............................. 137/116.5; 137/505.11
[58] Field of Search .............. 137/505.11, 116.3, 116.5

[56] References Cited

U.S. PATENT DOCUMENTS

| | | | |
|---|---|---|---|
| 2,192,141 | 2/1940 | McElwaine | 137/505.11 X |
| 2,487,650 | 11/1949 | Grove et al. | 137/505.11 |
| 2,747,607 | 5/1956 | Matsovic | 137/505.11 X |
| 2,894,526 | 7/1959 | Booth et al. | 137/116.5 |
| 2,963,040 | 12/1960 | Zimmer | 137/505.11 |
| 3,153,424 | 10/1964 | Acker et al. | 137/505.11 X |

Primary Examiner—William R. Cline
Attorney, Agent, or Firm—D. D. McGraw

[57] ABSTRACT

A hydraulic powered brake and parking brake arrangement powered by the power steering gear pump, and a pressure control assembly in the system. The control assembly acts as a pressure regulator for the parking brake actuators, provides for pressure relief to prevent a build up of excess pressure to the parking brake regulators, assures the provision of brake hold off pressure to the regulators even though the pressure from the power steering pump falls below the pressure required by the actuators, and provides for limiting the pressure available to the assembly when the power steering gear pump is working against a pressure in its upper range of capability.

2 Claims, 2 Drawing Figures

VALVE ASSEMBLY FOR A BRAKE SYSTEM

The invention relates to a brake system using a hydraulic power brake assembly powdered by the power steering gear pump and located downstream of the power steering gear. The system has parking brake actuators which are hydraulically released by pressure from the power steering pump. A multiple function valve assembly embodying the invention is positioned to receive pump output pressure and is arranged in parallel to the power steering gear and power brake. The assembly will provide an outlet pressure within a pressure range of about 80 to 90 psi relative to a widely variable inlet pressure which may range from about 80 to 1700 psi. The substantially constant pressure provided is delivered through a parking brake actuator control valve to the parking brake actuators to hold off the parking brakes. When the actuator valve is actuated, it closes to prevent the pressure from continuing to hold off the pressure-released, spring-applied parking brake actuators. The actuator control valve also relieves the pressure in the parking brake actuators to permit the actuators to apply the brakes in a parking mode. The valve assembly of the invention also provides for pressure relief for the outlet pressure to limit the pressure to the 80 to 90 psi, range, and prevents a decrease of the outlet pressure below this range, after the supply pressure has been sufficient to create the outlet pressure. The assembly includes a pressure limiting valve, a pressure relief valve, a check valve, and appropriate mechanism for operating the valves under the various conditions encountered.

The system in which the valve assembly is used is a modification of the system of United States patent application Ser. No. 689,457, entitled "Hydraulic Pressure Brake System With Spring Apply Pressure Release Parking Brake Mode", filed May 24, 1976, now abandoned. In the system of that application the hydraulic release, supply apply parking brake actuators are powered by a relatively low pressure downstream of the power steering gear. In the system utilizing the invention herein disclosed and claimed the power steering pump output is provided with a branch conduit delivering pressure to the parking brake control valve through the valve assembly embodying the invention. Since the valve assembly is capable of receiving pressures throughout the full range of capability of the power steering pump, various controls are required. These control features are integrated into the valve assembly.

In The Drawings

Figures 1, 2:
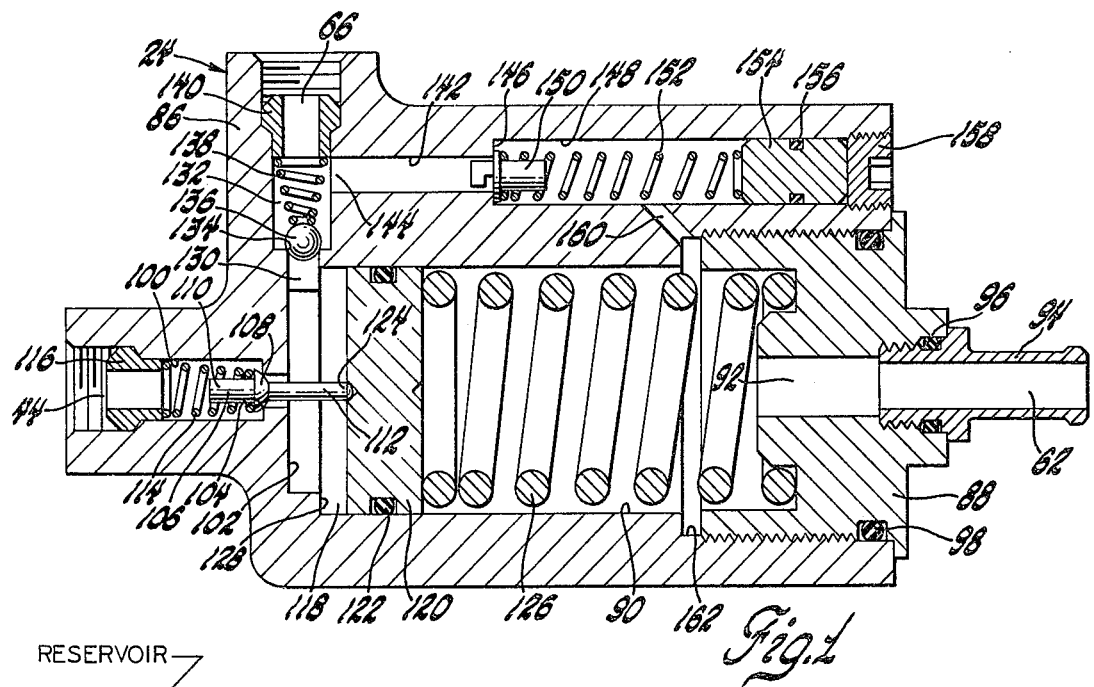
FIG. 1 is a cross section view of a valve assembly embodying the invention.
FIG. 2 is a schematic illustration of the entire hydraulic system using the valve assembly of FIG. 1.

Referring initially to the schematic illustration of the system as shown in FIG. 2, a vehicle provided with front wheel assemblies 10 and 12 and rear wheel assemblies 14 and 16 has a hydraulic system including a power steering pump 18, a power steering gear 20, a power brake assembly 22, a valve assembly 24, an actuator control valve 26, front brakes 28 and 30 and rear brake actuators 32 and 34. The brake actuators may be of the type disclosed in the above noted application, or of other suitable type. The power steering pump 18 is suitably driven by a power source such as the vehicle engine, as is common in the art. The pump includes a reservoir 36, a pumping section 38 connected with the reservoir to receive hydraulic fluid, and a pump output 40. Output 40 is connected by conduit 42 to the inlet 44 of valve assembly 24. Another conduit 46, also connected with pump output 40, is connected to the inlet 48 of the power steering gear. The power steering gear outlet 50 is connected to the inlet 52 of the power brake assembly 22 by a conduit 54. The outlet 56 of the power brake is connected by a conduit branch 58 to the main return conduit 60, which returns fluid to the reservoir 36. A relief outlet 62 of the valve assembly 24 is connected by conduit branch 64 to return conduit 60. The pressure outlet 66 of valve assembly 24 is connected by conduit 68 to the inlet 70 of the actuator control valve 26. A port 72 of the actuator control valve 26 is connected by a conduit 74 to the parking brake release portions of the brake actuators 32 and 34. The relief port 76 of valve 26 is connected by conduit branch 78 to return conduit 60. The master cylinder portion 80 of the power brake assembly 22 is illustrated as being of the dual type, with one brake line 82 connected to the front brakes 28 and 30 and another brake line 84 connected to the service brake actuating portions of rear brake actuators 32 and 34.

The valve assembly 24 is shown in greater detail in FIG. 1. It has a housing 86 in which is provided inlet 44, pressure outlet 66, and relief outlet 62. The relief outlet is fitted in an end plug 88 threaded into an open end of a bore 90 formed in housing 86. The plug 88 has a smaller axially extending bore 92 into which the relief outlet fitting 94 is threaded. A seal 96 provides a fluid seal between fitting 94 and plug 88, and another seal 98 similarly seals between plug 88 and housing 86.

A passage 100 connects inlet 44 with the end of bore 90 through the bore end wall 102. The passage has a shoulder formed in it defining a valve seat 104. The pressure limiting valve 106 is received within passage 100 and has a centrally positioned valve head 108 which cooperates with valve seat 104. Extending from either side of valve head 108 are valve pins 110 and 112. Pin 110 extends toward inlet 44 in a portion of passage 100 which may also be referred to as a valve chamber. A valve spring 114 surrounds pin 110 and has one end engaging valve head 108 and the other end engaging a spring seat formed by the end of inlet fitting 116. The valve is therefore continually urged to the closed position due to the pre-load of spring 114. Pin 112 extends through the inner portion of passage 100, with sufficient radial clearance relative to the passage wall to permit fluid flow therethrough when the valve is open. The pin extends through a chamber 118 defined by the inner end of bore 90, the bore end wall 102, and one side of a piston 120. This piston has a peripheral seal 122 which engages the wall of bore 90 in sealing relation and allows reciprocal movements of the piston in the bore. The end 124 of valve pin 112 engages a recess formed in piston 120. A piston spring 126 is received in bore 90 so that it engages piston 120 and seats against end plug 88, urging piston 120 leftwardly. A shoulder 128 in bore 90, and particularly in chamber 118, provides for limitation of piston movement toward bore end wall 102.

Radially extending passage 130 communicates with chamber 118 immediately adjacent bore end wall 102, the passage opening up into a larger section defining another valve chamber 132. A shoulder at the point where the passage opens up defines a valve seat 134. A check valve 136 of the ball type is received in valve chamber 132 and cooperates with valve seat 134. One end of a valve spring 138 engages check valve 136 and the other spring end is seated against an outlet fitting 140 in outlet 66. Thus, when check valve 136 is open, passage 130 is connected with outlet 66.

A passage 142, extending generally parallel to bore 90, has one end 144 opening into chamber 132, an intermediate shoulder defining a valve seat 146, and an enlarged bore section 148. A pressure relief valve 150 is received in bore section 148 and cooperates with valve seat 146. A valve spring 152 has one end engaging valve 150 and urging it toward engagement with seat 146. The other end of spring 152 is seated on the end of a slidable plug 154 reciprocably received in the outer end of bore section 148. A suitable seal 156 is provided on plug 154 to seal the plug against the bore wall. A threaded plug 158 is received in the threaded end of bore section 148 and may be adjusted to so position plug 154 that the pre-load on spring 152 sets the desired point at which pressure relief valve 150 opens. A passage 160 in housing 86 connects the center portion of bore section 148 to the enlarged right end portion 162 of bore 90 near the inner end of plug 88. Thus, when the pressure relief valve 150 is open, valve chamber 132 is connected with relief outlet 62.

In normal operation the power steering pump 18 is driven by the engine to pump hydraulic fluid through the system. When neither the power brake nor the power steering is being operated, the fluid flows through them with a relatively low back pressure. This pressure may be on the order of 80 to 100 psi upstream of the power steering gear. Therefore this pressure is found at the inlet 44 of the valve assembly 24. The fluid flows from pump 18 through conduits 40 and 46, through power steering gear 20 and conduit 54, through the power brake 22 and conduit 58, returning to the pump reservoir 36 through return conduit 60. When either the power brake assembly or the power steering gear is operated, the valving therein restricts the flow, causing a build-up of pressure upstream toward pump 18. The pressure can reach as much as about 1700 psi when the power steering gear is operated to its fullest extent. Therefore the supply pressure to valve assembly 24 can vary in normal operation from about 80 to 1700 psi, and will normally fall to zero pressure when the engine is not running. Actuation of the power brake assembly causes the master cylinder 80 to pressurize the brake circuits to apply the front and rear brakes through pressures transmitted in conduits 82 and 84. The inlet pressure for valve assembly 24, when initially applied, passes through passage 100 because the valve head 108 is held away from its seat 104 by piston 120 and spring 126. As the pressure increases to between 80 to 90 psi, piston 120 is moved rightwardly since the pressure in chamber 118 is then sufficient to overcome the force of spring 126. This permits valve spring 114 to move the valve 106 and close passage 100, thereby preventing further increase in pressure in chamber 118. It can be seen that when the pressure in chamber 118 decreases, piston 120 will be moved leftwardly by spring 126, reopening valve 106 and allowing the pressure in chamber 118 to again be increased to 80-90 psi. The pressure in chamber 118 also passes through passage 130, opening check valve 136 and goes out through outlet 66. The pressure relief valve 150 is normally closed, the force exerted by spring 152 being sufficient to keep it closed until about 120 psi is found in valve chamber 132. The pressure from outlet 66 passes through conduit 68 to actuator valve 26. This valve is so arranged that its inlet 70 and port 72 are in communication with each other, outlet port 76 being closed. The pressure therefore passes through conduit 74 to the hold-off portions of brake actuators 32 and 34. This pressure holds the brake apply springs in compression so that the parking brake mode is not active. Even if the power steering pump 18 is stopped for some reason, this pressure is maintained since check valve 136 will close, trapping the pressure in the portion of this system between valve assembly 24 and actuators 32 and 34.

When the vehicle operator desires to park the vehicle and apply the parking brakes, he operates the actuator control valve 26 to close inlet port 70 and connect port 72 with relief port 76. This causes the pressure in the actuators 32 and 34 to be returned to the reservoir 36 so that no pressure is contained in the actuators tending to hold-off the parking brake apply springs. The springs therefore actuate the brake actuators and the rear wheel brakes are applied in a parking mode. As soon as this is accomplished, the operator releases control valve 26, and the valve may return to its previous position in which ports 70 and 72 are connected. Since the engine is not running, there is no pressure available to reactuate the hold-off mechanism, and the parking brakes remain applied. The actuator valve 26 can be so constructed that it does not automatically return, therefore, keeping the parking brake applied even if the vehicle engine and power steering pump 18 are still running. When it is desired to release the parking brakes, the power steering pump 18 is operated and the actuator control valve 26 is positioned to re-connect its ports 70 and 72 while closing its port 76. The pressure is again transmitted as above described to the brake actuators and the hold-off springs are compressed to release the parking brakes. It is also known in the art to provide for a manual release of the springs when no pressure is available for this purpose.

If for any reason the pressure increases at outlet 66 beyond the pressure set for pressure relief valve 150 to open, the valve opens and allows the pressure to be relieved through bore 148, passage 160, the right end of bore 90, bore 92, and relief outlet 62 to pump reservoir 36 through conduits 64 and 60. This might occur, for example, due to a faster pressure increase in the pressure inlet 44 than can be reacted to by piston 120, providing momentary relief until valve 106 is closed. It may also occur if there is a temperature change in the actuators and the conduits 68 and 74, causing an increase in pressure in that portion of the system. It will also take care of the situation where the pressure limiting valve 106 is not operating properly.

What is claimed is:

1. A pressure regulator assembly for providing an outlet pressure within a pressure range defining a substantially constant pressure level relative to a widely variable inlet pressure range, pressure relief for the outlet pressure to limit outlet pressure increase, and for preventing outlet pressure decrease below a set pressure less than the substantially constant pressure level range subject to a minimum inlet pressure at least as great as said substantially constant pressure level range, said assembly comprising:

a housing having a pressure inlet, a pressure outlet, a relief outlet, and a chamber fluidly connected to said pressure inlet and said pressure outlet;

a pressure responsive movable member in said chamber and dividing said chamber into first and second chamber sections and forming one wall of each of said chamber sections and adapted to move to increase the volume of said first chamber section when the pressure therein tends to exceed said substantially constant pressure level range, and to move to decrease the volume of said first chamber section when the pressure therein returns to said substantially constant pressure level range;

a pressure limiting valve in said pressure inlet operatively engaged by said movable member to close when said movable member moves to increase the volume of said first chamber section beyond a point corresponding to the existence of pressure in said first chamber section tending to exceed said substantially constant pressure level range, and operatively engaged by said movable member to open when said movable member moves to decrease the volume of said first chamber section in response to pressure in said first chamber section returning to said substantially constant pressure level range;

a check valve positioned fluidly between said first chamber section and said pressure outlet, said check valve closing and retaining pressure in said pressure outlet when the pressure in said first chamber section decreases below said substantially constant pressure level range and opening when the pressure in said first chamber section is at least within said substantially constant pressure level range and greater than the pressure in said pressure outlet;

said relief outlet being in constant fluid communication with said second chamber section and a pressure relief valve in said relief outlet and connected to said pressure outlet fluidly downstream of said check valve and fluidly between said check valve and said second chamber section, said pressure relief valve being responsive to a set pressure greater than said substantially constant pressure level range to limit pressure in said pressure outlet to a maximum equal to said set pressure.

2. A valve assembly comprising:

a housing having a cylinder formed therein, an inlet opening into one cylinder end, a first outlet connected with the one cylinder end, a second outlet connected with the other cylinder end, and a bypass passage connecting said first outlet with said second outlet;

a piston reciprocably and sealingly received in said cylinder between said cylinder ends and having spring means urging said piston toward said cylinder one end;

a first valve in said first outlet permitting fluid flow only from said one cylinder end to said first outlet and said bypass passage;

a second valve in said bypass passage, said second valve being normally closed, and opening at a predetermined first pressure in said first outlet to provide pressure relief by bypassing fluid to said second outlet;

a third valve in said inlet yieldably urged in the closed direction to prevent flow from said inlet to said one cylinder end;

and a pin connecting said piston and said third valve and normally holding said third valve open by force of said piston spring means;

said piston being movable against said piston spring means in response to a predetermined second pressure in said one cylinder end to permit closure of said third valve, and causing said pin to open said third valve in response to a pressure decrease in said one cylinder end to a predetermined third pressure below said predetermined second pressure to regulate the pressure in said one cylinder end within a predetermined pressure range defined by said predetermined second and third pressures, said predetermined first pressure being greater than said predetermined second pressure.

* * * * *